(12) United States Patent
Wakabayashi et al.

(10) Patent No.: US 9,281,965 B2
(45) Date of Patent: Mar. 8, 2016

(54) COMMUNICATION SYSTEM AND MOBILE COMMUNICATION DEVICE

(75) Inventors: Taichi Wakabayashi, Yokohama (JP); Yu Nishino, Yokohama (JP); Yuya Matsubara, Yokohama (JP); Yudai Nagata, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 775 days.

(21) Appl. No.: 13/575,379

(22) PCT Filed: Jan. 27, 2011

(86) PCT No.: PCT/JP2011/051646
§ 371 (c)(1),
(2), (4) Date: Jul. 26, 2012

(87) PCT Pub. No.: WO2011/093399
PCT Pub. Date: Aug. 4, 2011

(65) Prior Publication Data
US 2012/0302264 A1 Nov. 29, 2012

(30) Foreign Application Priority Data

Jan. 27, 2010 (JP) ................................. 2010-016051

(51) Int. Cl.
*H04W 24/00* (2009.01)
*H04L 12/66* (2006.01)
(Continued)

(52) U.S. Cl.
CPC ................ *H04L 12/66* (2013.01); *G08G 1/164* (2013.01); *G08G 1/20* (2013.01); *H04L 12/6418* (2013.01); *H04L 67/18* (2013.01); *H04M 1/72577* (2013.01)

(58) Field of Classification Search
CPC ..... H04L 12/66; H04L 67/18; H04L 12/6418; H04M 1/72577; G08G 1/164; G08G 1/20
USPC ......................................................... 455/457
See application file for complete search history.

(56) References Cited

U.S. PATENT DOCUMENTS

2008/0207244 A1* 8/2008 Roggero ........................ 455/522
2010/0102954 A1* 4/2010 Radivojevic et al. .... 340/539.11
(Continued)

FOREIGN PATENT DOCUMENTS

| JP | 2981419 B2 | 11/1999 |
| JP | 2001116564 A | 4/2001 |

(Continued)

OTHER PUBLICATIONS

Office Action mailed Apr. 30, 2014, corresponds to Japanese patent application No. 2010-016051, for which an explanation of relevance is attached.
(Continued)

*Primary Examiner* — Shahriar Behnamian
(74) *Attorney, Agent, or Firm* — Hauptman Ham, LLP

(57) ABSTRACT

According to an aspect, a communication system includes at least one mobile communication device, at least one movable communication device, and a server. The mobile communication device includes: a first position information obtaining unit for obtaining position information of the mobile communication device; and a first communication unit for communicating with another communication device. The movable communication device includes: a second position information obtaining unit for obtaining position information of the movable communication device; and a second communication unit for communicating with another communication device. The server stores the position information through communication with the mobile communication device and the movable communication device, and transmits the stored position information to at least one of the mobile communication device and the movable communication device.

18 Claims, 7 Drawing Sheets

(51) Int. Cl.
*G08G 1/00* (2006.01)
*H04L 12/64* (2006.01)
*G08G 1/16* (2006.01)
*H04M 1/725* (2006.01)
*H04L 29/08* (2006.01)

(56) References Cited

U.S. PATENT DOCUMENTS

2011/0090093 A1* 4/2011 Grimm et al. ............ 340/901
2012/0316768 A1* 12/2012 Haran ........................ 701/300

FOREIGN PATENT DOCUMENTS

| JP | 2002123896 | A | 4/2002 |
| JP | 2002288785 | A | 10/2002 |
| JP | 3350817 | B2 | 11/2002 |
| JP | 2003106842 | A | 4/2003 |
| JP | 2008059251 | A | 3/2008 |
| JP | 200915494 | A | 1/2009 |
| JP | 200986982 | A | 4/2009 |
| JP | 2009134759 | A | 6/2009 |

OTHER PUBLICATIONS

International Search Report and Written Opinion for PCT/JP20111051646, dated Apr. 19, 2011.

Office Action mailed Dec. 24, 2013, corresponds to Japanese patent application No. 2010-016051, for which an explanation of relevance is attached.

* cited by examiner

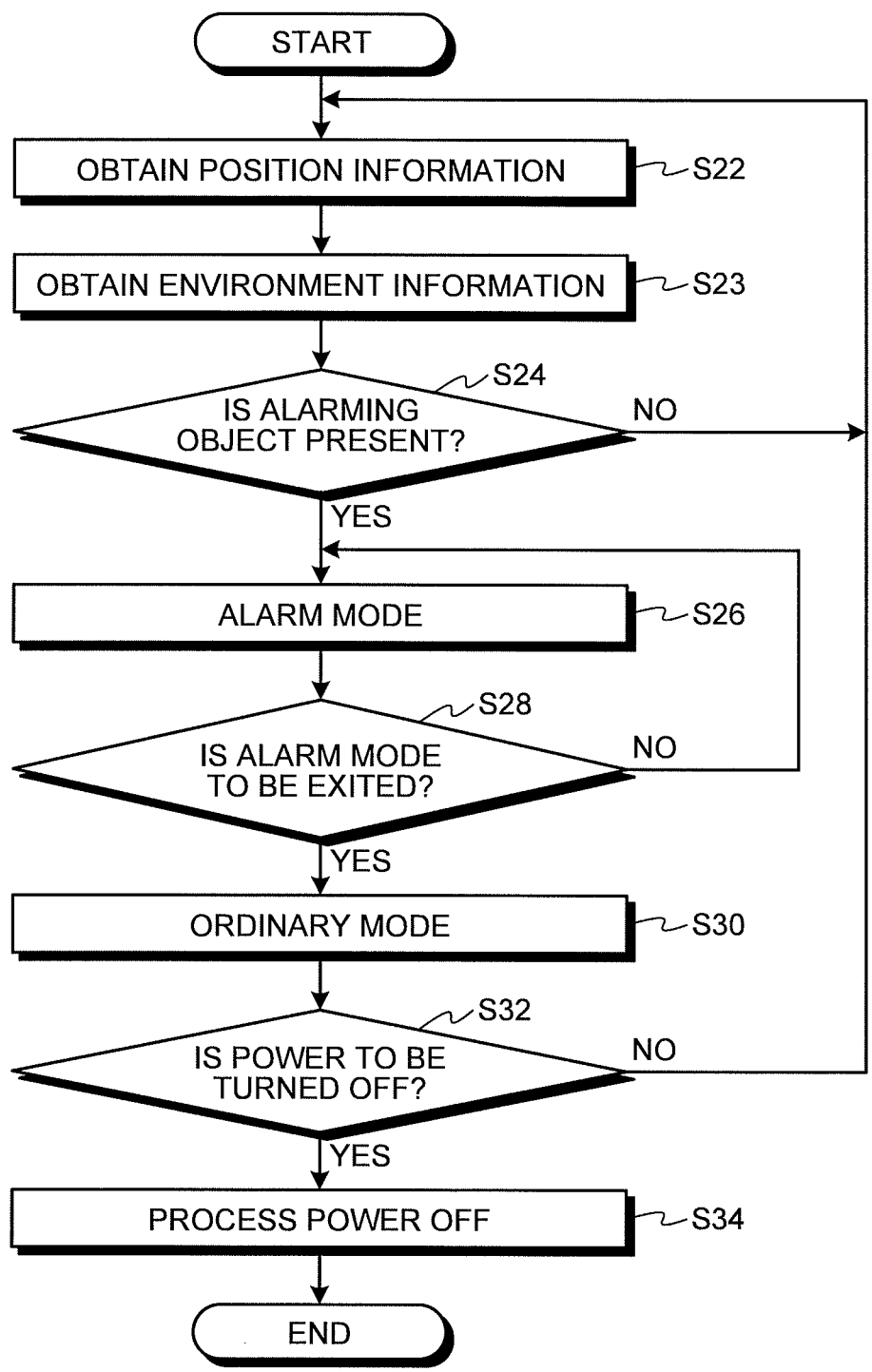

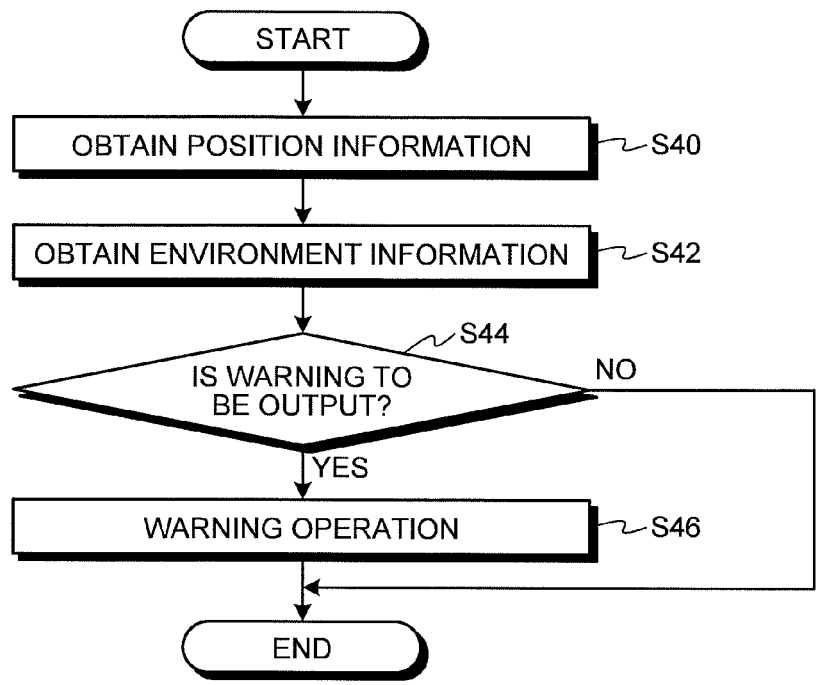
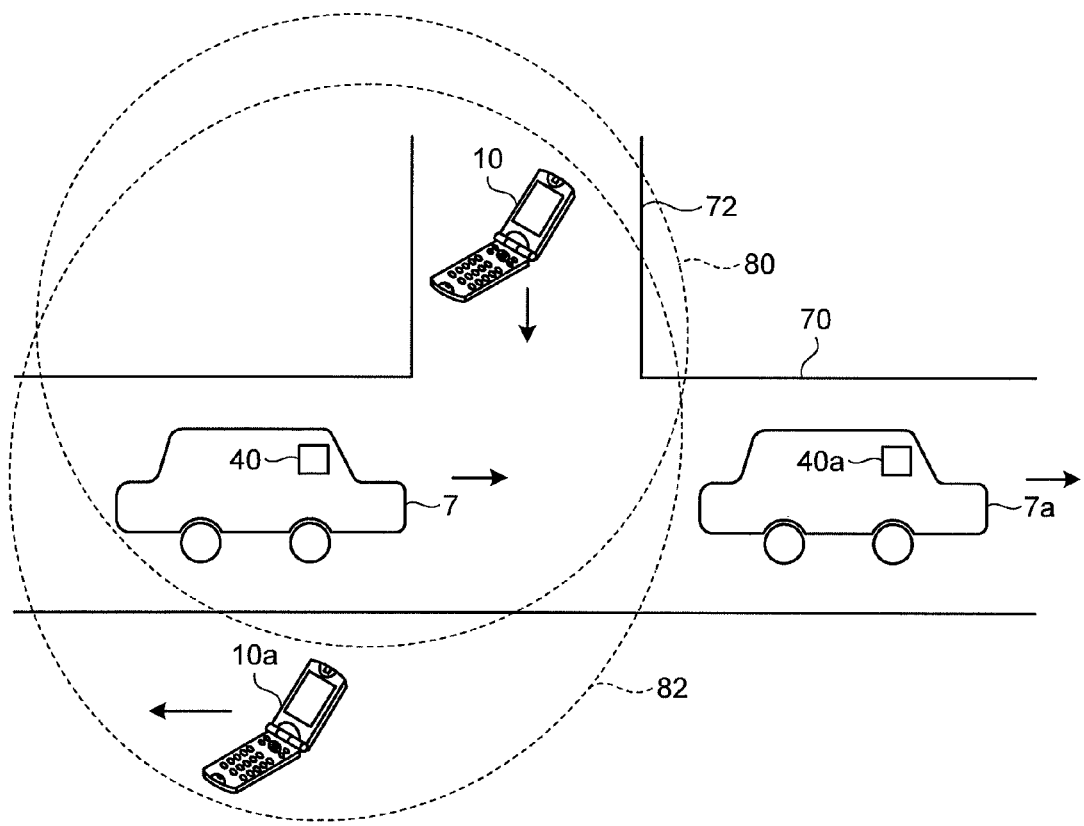

COMMUNICATION SYSTEM AND MOBILE COMMUNICATION DEVICE

CROSS-REFERENCE TO RELATED APPLICATION

This application is a National Stage of international application No. PCT/JP2011/051646 filed on Jan. 27, 2011 which designates the United States, and which is based upon and claims the benefit of priority from Japanese Patent Application No. 2010-016051, filed on Jan. 27, 2010.

FIELD

The present disclosure relates to a mobile communication device that communicates with another communication device and a communication system including the mobile communication device.

BACKGROUND

In recent years, various functions are mounted in a mobile communication device such as a mobile phone and a communication system using mobile communication devices. One of such functions is a risk aversion function.

For example, Patent Literature 1 discloses a safety information providing device that gathers safety information and disaster information from predetermine domestic and local organizations, calculates reliability of the gathered safety information, and provides users with only safety information with reliability that is equal to or larger than a predetermined value. Patent Literature 1 also proposes a method of informing a user that the user is approaching a dangerous area by means of an alarm.

Patent Literature 2 discloses an identification tag to be connected to an external connection terminal of a mobile phone whereby allowing to make a phone call to a predetermined contact person. Although this is not an example of a mobile communication device, Patent Literature 3 discloses a crime prevention system that transmits a signal from an open/close sensor over a wireless digital signal wave.

CITATION LIST

Patent Literatures

Patent Literature 1: Japanese Patent Application Laid-Open No. 2008-59251
Patent Literature 2: Japanese Patent Application Laid-Open No. 2002-306009
Patent Literature 3: Japanese Patent Application Laid-Open No. 9-185774

Technical Problem

With the device disclosed in Patent Literature 1, the user can be kept away from dangerous areas since the user is informed by means of an alarm when the user is approaching a dangerous area. Although the device disclosed in Patent Literature 1 can give a warning for dangerous areas that are registered in advance, the device cannot support sudden changes in situations.

For example, collision accidents between a car and a person, a car and a bicycle, or a person and a person may occur on roads, particularly at blind intersections. Accidents are often caused by a person, a bicycle or a car suddenly rushing out from a shadowy place into a road.

For the foregoing reasons, there is a need for a communication system and a mobile communication device capable of more securely ensure the safety while travelling.

SUMMARY

According to an aspect, a communication system includes at least one mobile communication device, at least one movable communication device, and a server. The mobile communication device includes: a first position information obtaining unit for obtaining position information of the mobile communication device; and a first communication unit for communicating with another communication device. The movable communication device includes: a second position information obtaining unit for obtaining position information of the movable communication device; and a second communication unit for communicating with another communication device. The server stores the position information through communication with the mobile communication device and the movable communication device, and transmits the stored position information to at least one of the mobile communication device and the movable communication device.

According to another aspect, the server extracts the position information of the movable communication device that is within a preset range around the mobile communication device on a basis of the position information of the mobile communication device transmitted therefrom, and transmits the extracted position information to the mobile communication device. The mobile communication device performs a warning process when the movable communication device that is within a predetermined distance and approaching the mobile communication device or approaching an area on an extension in a traveling direction of the mobile communication device is present on a basis of position information of the movable communication device transmitted from the server.

According to another aspect, the mobile communication device transmits the position information of the mobile communication device to the server via the first communication unit only when the position information is within a predetermined area.

According to another aspect, the server extracts the position information of the mobile communication device that is within a preset range around the movable communication device on a basis of the position information of the movable communication device transmitted therefrom, and transmits the extracted position information to the movable communication device. The movable communication device performs a warning process when the mobile communication device that is within a predetermined distance and approaching the movable communication device or approaching an area on an extension in a traveling direction of the movable communication device is present on a basis of position information of the mobile communication device transmitted from the server.

According to another aspect, a mobile communication device includes: a communication unit for communicating with another communication device; a position information obtaining unit for detecting a position of the mobile communication device; an environment information obtaining unit for obtaining position information of a second communication device present around the mobile communication device on a basis of information of the position of the mobile communication device obtained by the position information obtaining unit; a warning unit for performing a warning process; and a control unit for controlling operation of the warning unit on a basis of information obtained by the environment information obtaining unit.

According to another aspect, the second communication device is a communication device to be held by a pedestrian.

According to another aspect, the second communication device is a communication device mounted in a vehicle.

According to another aspect, the environment information obtaining unit obtains the position information of another communication device that is present within a predetermined range as the position information of the second communication device. The control unit calculates a traveling direction of the second communication device from the information obtained by the environment information obtaining unit, and causes the warning process to be performed when the second communication device is determined to be approaching the mobile communication device and a distance thereto is determined to be within a predetermined range.

According to another aspect, the environment information obtaining unit obtains the position information of another communication device that is approaching to the position of the mobile communication device and at a distance within a predetermined range as the position information of the second communication device, and the control unit causes the warning process to be performed when the environment information obtaining unit obtains the information.

According to another aspect, the control unit switches the warning process performed by the warning unit depending on a distance to second communication device.

According to another aspect, the mobile communication device further includes: a map information obtaining unit for obtaining map information; and a display unit for displaying an image. The control unit causes the display unit to display an image in which the position information of the second communication device that is present around the mobile communication device obtained by the environment information obtaining unit is superimposed on the map information.

According to another aspect, the map information obtaining unit obtains the map information including the position information obtained by the position information obtaining unit from an external storage device on a basis of the position information.

According to another aspect, the position information obtaining unit obtains position information by a global positioning system.

According to another aspect, the warning unit performs at least one of outputting a sound, emitting a smell, generating a vibration, applying an electric current, displaying an image, and changing a temperature as the warning process.

According to another aspect, a mobile communication device includes: an environment information obtaining unit for obtaining information on environment of the mobile communication device; a warning unit for performing a warning process; a control unit for controlling operation of the warning unit on a basis of the information obtained by the environment information obtaining unit; and a storage unit for storing information of a second communication device that is prohibited from approaching. The environment information obtaining unit communicates with another communication device through a short-range communication technology to obtain information of the communication device. The control unit causes the warning unit to perform the warning process when the second communication device that is prohibited from approaching is determined to be within a predetermined distance on a basis of the information of another communication device obtained by the environment information obtaining unit.

According to another aspect, the second communication device is arranged in a prohibited area.

According to another aspect, the second communication device is a communication device mounted in a vehicle.

According to another aspect, the warning unit performs at least one of outputting a sound, emitting a smell, generating a vibration, applying an electric current, displaying an image, and changing a temperature as the warning process.

Advantageous Effects of Invention

The communication system and the mobile communication device according to the present invention produce an advantageous effect of being capable of more securely ensuring the safety while travelling.

BRIEF DESCRIPTION OF DRAWINGS

FIG. 6 is a flowchart illustrating an example of processing operation of the mobile communication device.

FIG. 7 is a flowchart illustrating an example of processing operation of the mobile communication device.

FIG. 8 is an explanatory diagram for explaining an example of processing operation of the communication system.

DESCRIPTION OF EMBODIMENTS

The present invention will be described in detail below with reference to the drawings. The present invention is not limited to the description below. Components in the description below encompass components that readily occur to those skilled in the art, that are substantially identical, or that fall into so-called equivalent ranges. A mobile phone will be described as an example of the mobile communication device in the following description; however, the application of the present invention is not limited to mobile phones but the present invention may be used for various communication devices having a telephone function. For example, the present invention can also be applied to mobile communication devices such as PHSs (personal handy-phone systems) and PDAs. An onboard communication device according to the embodiment is also an example of the mobile communication devices. Mobile communication devices having only the functions according to the present invention (that is, not having functions as a phone or functions as an information terminal (namely, personal computer)) can be used.

Figure 1:
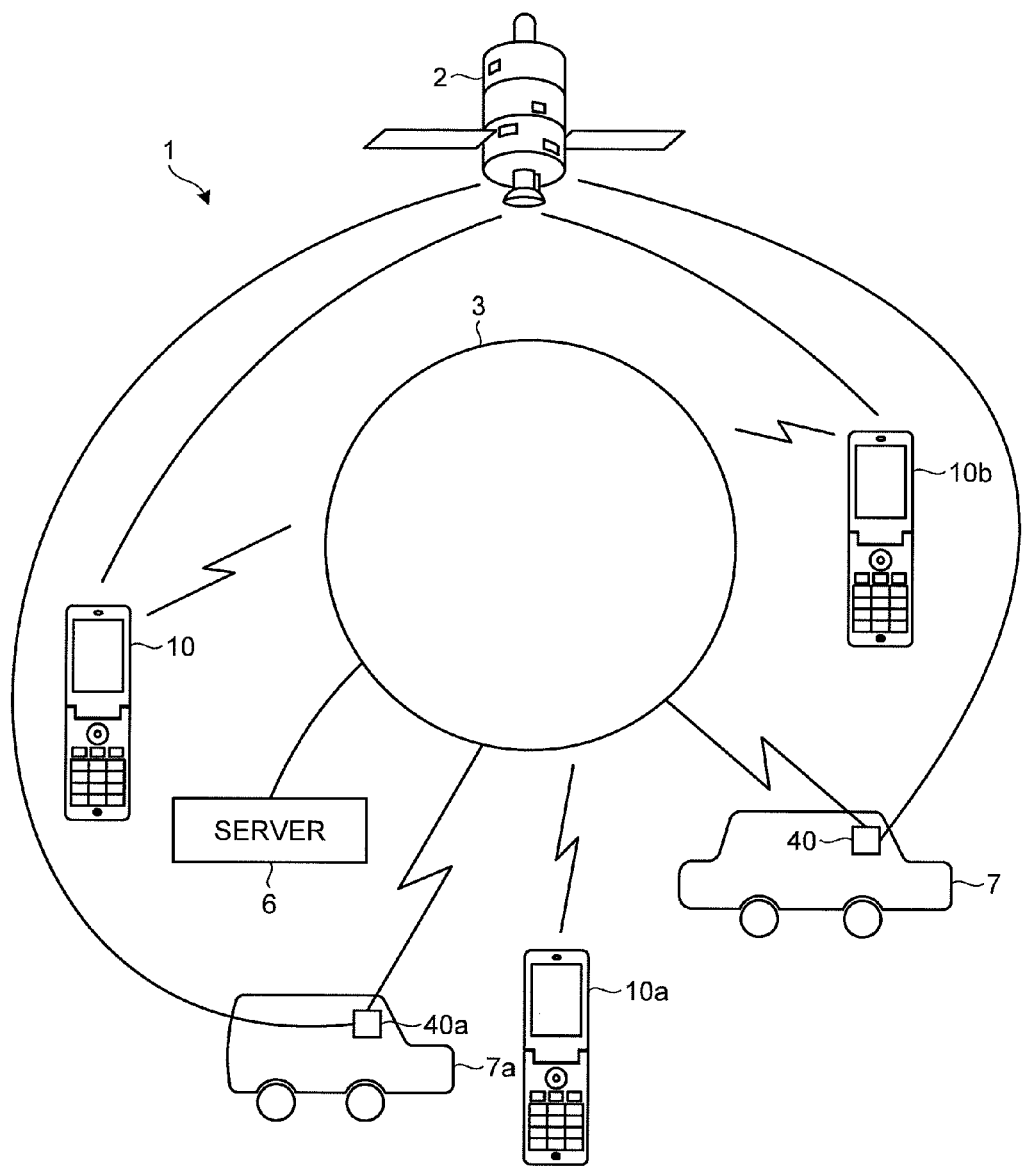
FIG. 1 is an explanatory diagram illustrating a schematic configuration of a communication system including a mobile communication device according to an embodiment.

FIG. 1 is an explanatory diagram illustrating a schematic configuration of a communication system including a mobile communication device according to an embodiment. The communication system 1 illustrated in FIG. 1 includes a GPS satellite 2, a communication network 3, a server 6, a plurality of mobile communication devices 10, 10a, and 10b, and a plurality of onboard communication devices 40 and 40a. The onboard communication device 40 is mounted in a car 7, and the onboard communication device 40a is mounted in a car 7a.

The GPS satellite 2 is a satellite that transmits (provides) position information of a communication device (communication terminal, communication equipment) having a communication function of a GPS (global positioning system) to the communication device. Although only one GPS satellite 2 is illustrated in FIG. 1, the number of the GPS satellites 2 is a number (typically three or four) necessary for specifying positions of the communication devices. The GPS satellite 2 outputs GPS signals (position information and time information of the GPS satellite 2) necessary for identifying position information of communication devices. A communication device obtains its position information by obtaining and analyzing a GPS signal output from the GPS satellites 2. The analysis may be performed by the communication device itself, or may be performed by an external server 6.

The communication network 3 includes a plurality of base stations, exchanges and wired communication lines. The communication network 3 performs information communication between communication devices by using wired and wireless communication paths. The communication network 3 can used various communication methods as long as communication between communication devices can be performed thereby. For example, communication may be performed by using satellite channels.

The server 6 has various data such as map information and information (telephone numbers, addresses) for identifying the communication devices, and communicates with communication devices via the communication network 3 to provide various information. The server 6 also performs processing of receiving information from a communication device and transmitting information to another communication device on the basis of the received information (that is, relay of information). Thus, the server 6 collects and stores information transmitted from the communication devices, and supplies (provides) the collected information as necessary to the communication devices. The server 6 may also process the collected information and provides the processed information to the communication devices.

The mobile communication devices 10, 10a, and 10b are communication terminals that perform wireless communication with the communication network 3. The mobile communication devices 10, 10a, and 10b transmit signals such as voice signals to the network 3 and receive signals such as voice signals from the network 3. Each mobile communication terminal has a unique telephone number and terminal number assigned thereto and stored therein. The configuration of the mobile communication devices 10, 10a, and 10b will be described later.

The onboard communication devices 40 and 40a are communication terminals that perform wireless communication with the communication network 3. The onboard communication devices 40 and 40a transmit various information to the communication network 3 and receive various information from the communication network 3. Each mobile communication terminal has a unique terminal number (such as an IP address) assigned thereto and stored therein. The onboard communication devices 40 may be any devices having a position detecting function and a communication function and mounted in cars 7 and 7a. Examples of the onboard communication devices 40 that can be used include devices having function of a so-called ITS (intelligent transport system) such as a car navigation system and a communication device that transmits information (such as driving history) of cars 7 to outside. The onboard communication devices 40 may be provided as communication devices dedicated to the functions according to one aspect of the present invention. The configuration of the onboard communication devices 40 and 40a will be described later.

The communication system 1 has the configuration as described above. The communication system 1 performs data communication between the mobile communication devices 10 by transmitting/receiving information via the communication network 3. The communication system 1 can also perform communication between the mobile communication devices 10 and the server 6 and between the onboard communication devices 40 and the server 6 in addition to information communication between the mobile communication devices 10. The communication system 1 can also perform voice communication (namely telephone) in addition to transmission/reception of data as communication between communication devices. The mobile communication devices 10 and the onboard communication devices 40 can also obtain position information from the GPS satellites 2. Furthermore, the communication system 1 can also perform communication by short-range communications without the communication network 3 between the mobile communication devices 10, between the onboard communication devices 40 and between the mobile communication devices 10 and the onboard communication devices 40. Although only one server 6, three mobile communication devices 10 (10, 10a and 10b) and two onboard communication devices 40 (40 and 40a) are illustrated in FIG. 1, the communication system 1 can include a number of servers 6, mobile communication devices 10 and onboard communication devices 40.

Figure 2:
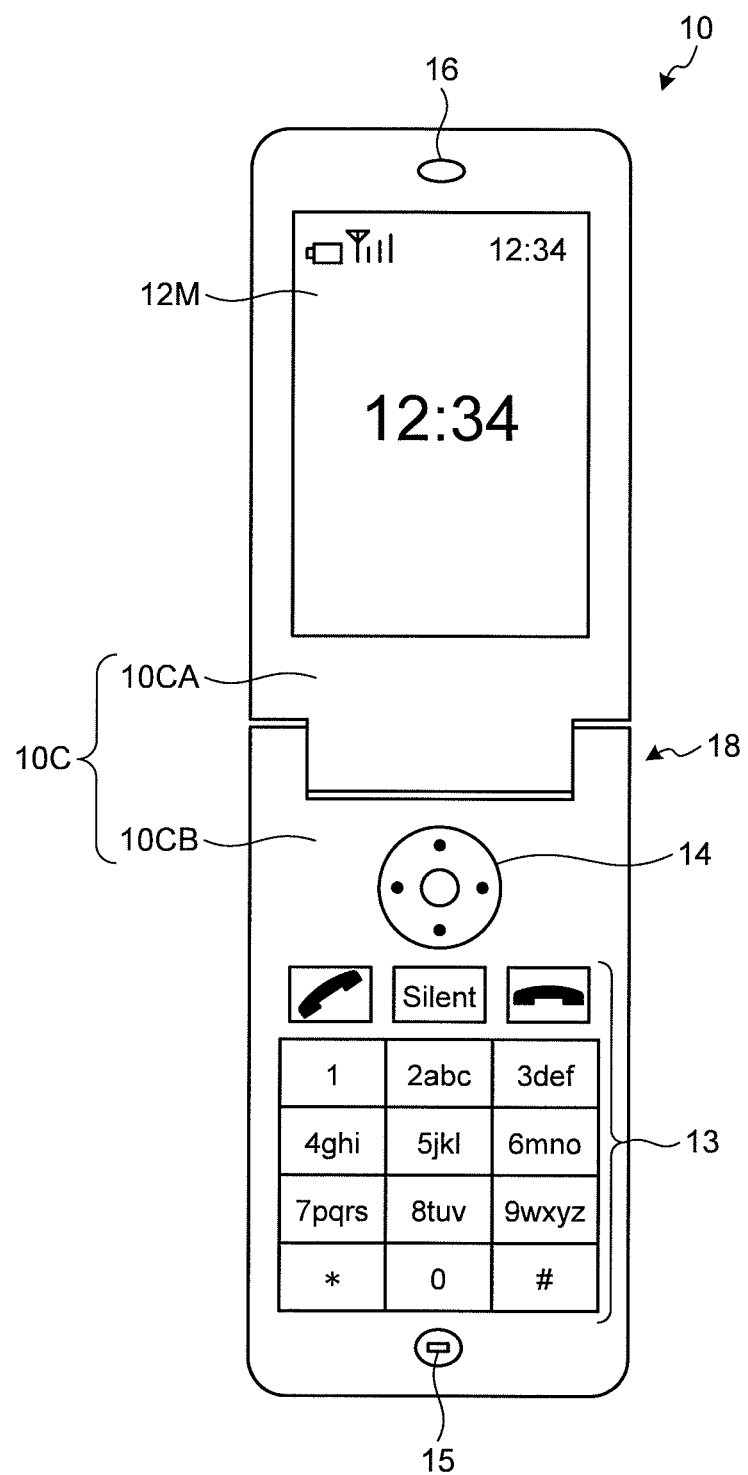
FIG. 2 is a front view illustrating a schematic configuration of the mobile communication device illustrated in FIG. 1.

Next, the mobile communication devices 10, 10a, and 10b will be described. Since the mobile communication device 10, the mobile communication device 10a and the mobile communication device 10b may have the same device configuration, the mobile communication device 10 will be described below. FIG. 2 is a front view illustrating a schematic configuration of the mobile communication device illustrated in FIG. 1. The mobile communication device 10 is a mobile phone having a wireless communication function. The mobile communication device 10 is a folding type mobile phone having a housing 10C including a first housing 10CA and a second housing 10CB with which the housing 10C can be opened and closed. FIG. 2 illustrates a state in which the mobile communication device 10 is opened. Although the housing 10C of the mobile communication device 10 is described as a folding type in the present embodiment, the shape of the housing is not particularly limited. The housing may be in various forms such as a sliding type, a cycloid type, a revolving type and a straight type.

The first housing 10CA is provided with a main display 12M illustrated in FIG. 2 as a display unit. The main display 12M displays, as predetermined images, a standby screen in a state where the mobile communication device 10 is waiting for incoming signals or a menu image to be used for assisting the operation of the mobile communication device 10. As illustrated in FIG. 2, the first housing 10CA is also provided with a receiver 16 that emits voice during a call using the mobile communication device 10.

The second housing 10CB is provided with a plurality of operation keys 13 for inputting telephone numbers of persons to be called and texts to compose mail messages and arrow and enter keys 14 for easily selecting and deciding options from menus displayed on the main display 12M and easily scrolling the viewing area on the screen. The operation keys 13 and the arrow and enter keys 14 constitute an operating unit 28 (see FIG. 3) of the mobile communication device 10. The second housing 10CB is also provided with a microphone 15 that receives voice during a call using the mobile communication device 10.

The first housing 10CA and the second housing 10CB are connected by a hinge 18. With this structure, both the first housing 10CA and the second housing 10CB can turn around the hinge 18 in a direction away from each other and in a direction toward each other. The mobile communication device 10 is opened when the first housing 10CA and the second housing 10CB turn in the direction away from each other, while the mobile communication device 10 is closed when the first housing 10CA and the second housing 10CB turn in the direction toward each other.

Figure 3:
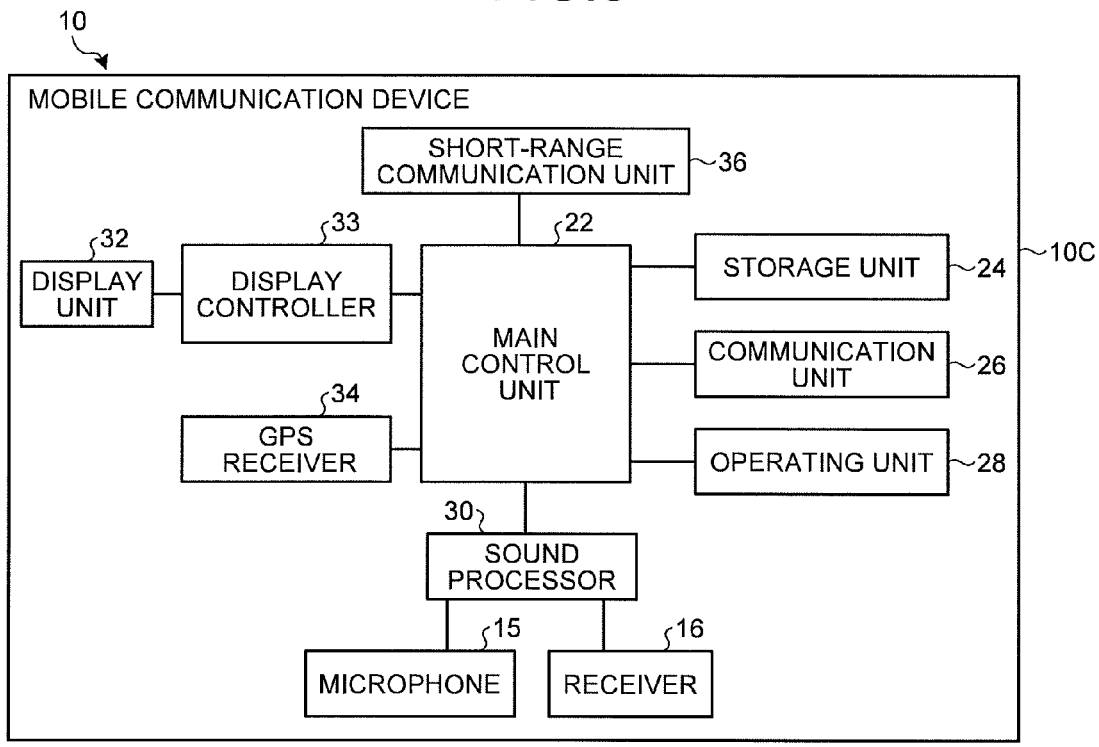
FIG. 3 is a block diagram illustrating a schematic functional configuration of the mobile communication device illustrated in FIG. 2.

Next, the relation between functions of the mobile communication device 10 and a control unit will be described. FIG. 3 is a block diagram illustrating a schematic functional configuration of the mobile communication device illustrated in FIG. 2. As illustrated in FIG. 3, the mobile communication device 10 includes a main control unit 22, a storage unit 24, a communication unit 26, the operating unit 28, a sound processor 30, a display unit 32, a display controller 33, a GPS receiver 34 and a short-range communication unit 36.

The main control unit 22 is a processing unit that integrally controls overall operation of the mobile communication device 10, such as a CPU (central processing unit). Specifically, the main control unit 22 controls operation of the communication unit 26, the display unit 32 and the like so that various processes of the mobile communication device 10 are performed by appropriate procedures according to operation of the operating unit 28 and software saved in the storage unit 24 of the mobile communication device 10. The main control unit 22 performs processes on the basis of programs (such as operating system programs and application programs) saved in the storage unit 24. The main control unit 22 can execute a plurality of programs (applications, software) in parallel.

The storage unit 24 stores therein programs and data of applications to be used for processes by the main control unit 22. Specifically, examples of the application programs that are stored include a program of an application for processing an incoming call, an outgoing call and a call in progress, a program of an application for transmitting its position information to the server, a program of an application for performing a warning process based on environment information, and a program of an application for transmitting and receiving mails. Examples of data include image data, sound data, dictionary data for character conversion, and address book data.

The communication unit 26 establishes wireless signal path using the CDMA system, the LTE system or the like with the communication network 3 described above through channels assigned by the communication network 3 to perform telephone communication and information communication with the communication network 3. Thus, the user can transmit and receive data and make a call with desired persons by communication using the communication unit 26.

The operating unit 28 includes operation keys 13 to which various functions are assigned such as a power key, a call key, numeric keys, character keys, arrow keys and an originating call key, and arrow and enter keys 14. Upon receiving an input by operation of these keys by the user, the operating unit 28 generates signals corresponding to the operation. The generated signals are input as user's instruction to the main control unit 22.

The sound processor 30 processes sound signals input to the microphone 15 and sound signals output from the receiver 16.

The display unit 32 includes a display panel (such as the main display 12M described above) having an LCD (liquid crystal display) and an organic EL (organic electro-luminescence) panel, and displays video according to video data and images according to image data supplied from the main control unit 22 via the display controller 33 on the display panel.

The GPS receiver 34 is a communication unit that receives GPS signals transmitted from the GPS satellites 2. The GPS receiver 34 calculates the latitude and longitude of the mobile communication device 10 from the received GSP signals, and sends information on the calculated latitude and longitude to the main control unit 22. Specifically, the GPS receiver 34 acquires GPS signals from a plurality of GPS satellites 2, and calculates distances from the respective GPS satellites 2 from differences in time between time information contained in the GPS signals and time information of acquisition and the intensities of received waves. The GPS receiver 34 calculates its position by analyzing the distances from the GPS satellites 2 and position information of the respective GPS satellites 2.

The short-range communication unit 36 is a communication unit that performs communication with other communication devices using a short-range wireless communication technology. Examples of the short-range wireless communication technology that can be used include the Bluetooth and a RFID (radio frequency identification) technology. For example, when the RFID technology is used, the short-range communication unit 36 includes an IC tag for identifying itself and a reader unit that reads IC tags of other communication devices.

Figure 4:
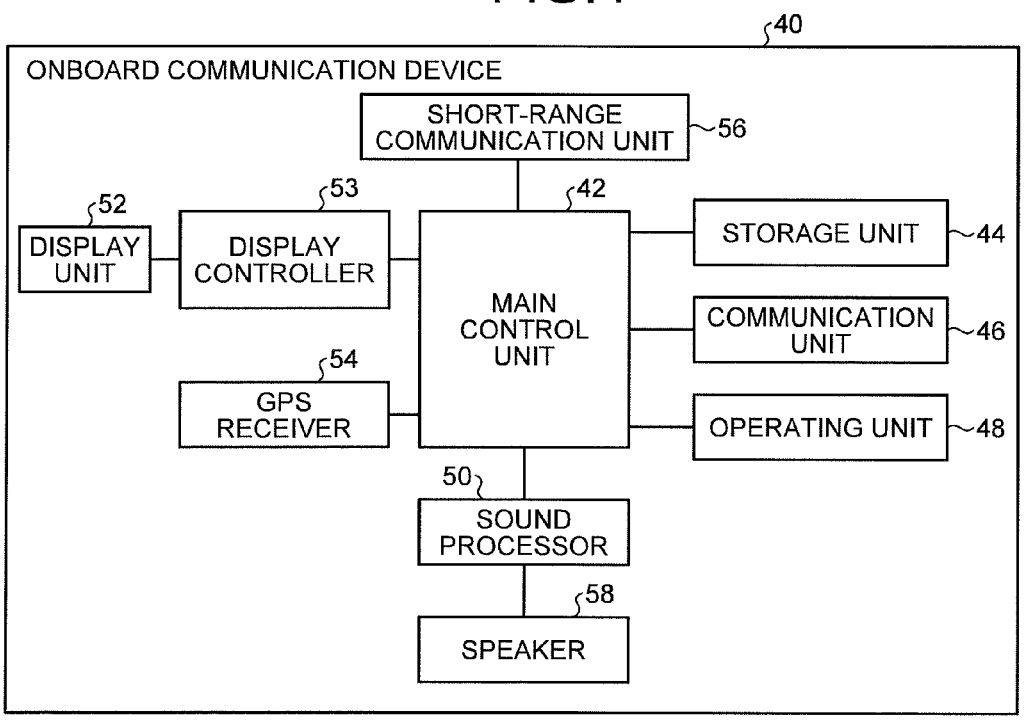
FIG. 4 is a block diagram illustrating a schematic functional configuration of an onboard communication device illustrated in FIG. 1.

Next, the onboard communication devices 40 and 40a will be described with reference to FIG. 4. Since the onboard communication device 40 and the onboard communication device 40a have the same device configuration, the onboard communication device 40 will be described below. FIG. 4 is a block diagram illustrating a schematic functional configuration of the onboard communication device. As illustrated in FIG. 4, the onboard communication device 40 includes a main control unit 42, a storage unit 44, a communication unit 46, an operating unit 48, a sound processor 50, a display unit 52, a display controller 53, a GPS receiver 54 and a short-range communication unit 56. The main control unit 42, the storage unit 44, the communication unit 46, the operating unit 48, the sound processor 50, the display unit 52, the display controller 53, the GPS receiver 54 and the short-range communication unit 56 have basically the same configurations as the units of the mobile communication device 10. Thus, parts that are the same will be briefly described and features unique to the onboard communication device 40 will be described in detail below.

The main control unit 42 is a processing unit that integrally controls overall operation of the onboard communication device 40, such as a CPU (central processing unit). The storage unit 44 stores therein programs and data of applications to be used for processes by the main control unit 42. The storage unit 44 also stores a program of an application for performing navigation as necessary in addition to a program of an application for transmitting its position information to the server, a program of an application for performing a warning process based on environment information. The storage unit 44 can also store map information and the like as the data.

The communication unit 46 performs communication with other communication devices via the communication network 3 described above. The operating unit 48 detects operation by the user and inputs the input operation as signals to the main control unit 42. The sound processor 50 is connected to a speaker 58, converts sound data sent from the main control unit 42 into sound signals and outputs the sound signals through the speaker 58. The display unit 52 displays video according to video data and images according to image data supplied from the main control unit 42 via the display controller 53 on the display panel.

The GPS receiver 54 is a communication unit that receives GPS signals transmitted from the GPS satellites 2. The GPS receiver 54 calculates the latitude and longitude of the onboard communication device 40 from the received GSP signals, and sends information on the calculated latitude and longitude to the main control unit 42. Specifically, the GPS receiver 54 acquires GPS signals from a plurality of GPS satellites 2, and calculates distances from the respective GPS satellites 2 from differences in time between time information contained in the GPS signals and time information of acquisition and the intensities of received wave propagation. The GPS receiver 54 calculates its position by analyzing the distances from the GPS satellites 2 and position information of the respective GPS satellites 2.

The short-range communication unit 56 is a communication unit that performs communication with other communication devices using a short-range wireless communication technology. The onboard communication device 40 has the configuration as described above.

Next, operation of the mobile communication device 10 and the onboard communication device 40 will be described with reference to FIGS. 5 to 8. The processing operations of the mobile communication device 10 and the onboard communication device 40 are the same except that the mobile communication device 10 is held by a pedestrian, etc., while the onboard communication device 40 is held in a car. The operation of the mobile communication device 10 will thus be described below as a representative example. As will be described later, while the processing operations of the mobile communication device 10 and the onboard communication device 40 are the same, data (information) to be processed are different depending on whether the devices are held by a pedestrian or in a car.

Figure 5:
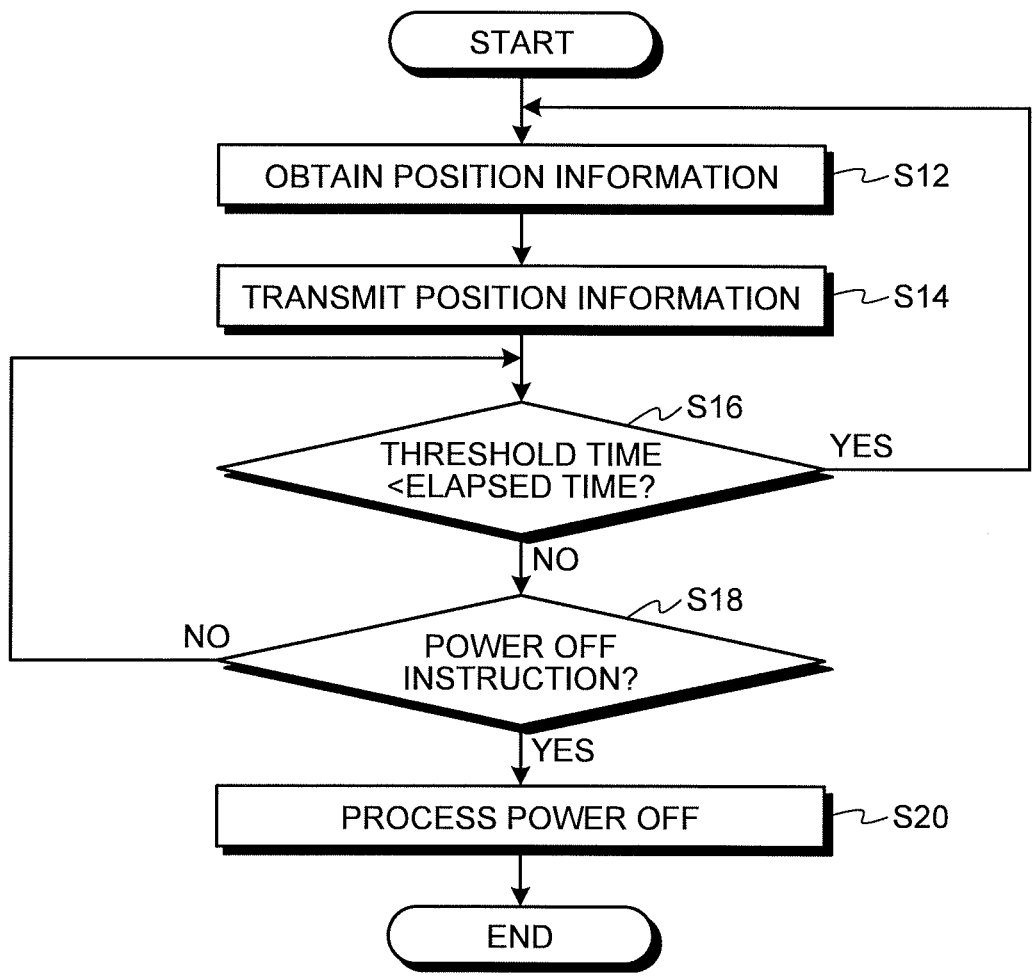
FIG. 5 is a flowchart illustrating an example of processing operation of the mobile communication device.

First, the operation of the mobile communication device 10 will be described with reference to FIG. 5. FIG. 5 is a flowchart illustrating an example of processing operation of the mobile communication device. More specifically, FIG. 5 is a flowchart illustrating processing operation of an application for transmitting the position information of the mobile communication device 10 to the server. First, the mobile communication device 10 starts processing by loading a program of the application, stored in the storage unit 24, for transmitting its position information to the server onto the main control unit 22 and executing the application for transmitting its position to the server.

First, the main control unit 22 obtains position information at Step S12. Specifically, the main control unit 22 obtains the position information from the GPS satellites 2 by using the GPS receiver 34, and uses the obtained position information as its position information. After obtaining the position information at Step S12, the main control unit 22 transmits the position information at Step S14. Specifically, the main control unit 22 transmits the position information obtained at Step S12 to the server 6 via the communication unit 26 and the communication network 3.

The main control unit 22 then determines whether a certain time has elapsed at Step S16. In other words, the main control unit 22 determines whether a threshold time<the elapsed time is satisfied, that is, whether the elapsed time is longer than the threshold time. The elapsed time refers to the time elapsed since the position information is obtained at Step S12. If it is determined that the threshold time<the elapsed time is satisfied (Yes), that is, if it is determined that the elapsed time is longer than the threshold time at Step S16, the main control unit 22 proceeds to Step S12 and obtains the position information again.

If it is determined that the threshold time the elapsed time is satisfied (No), that is, if it is determined that the elapsed time is equal to or shorter than the threshold time at Step S16, the main control unit 22 determines whether there is a power OFF instruction at Step S18. The power OFF instruction is an instruction to stop power supply to the respective units to stop the functions of the mobile communication device 10. The power OFF instruction is input by operation of the user or according to settings. If it is determined that there is no power OFF instruction (No) at Step S18, the main control unit 22 proceeds to Step S16 and determines whether the threshold time<the elapsed time is satisfied. Thus, when the elapsed time is equal to or shorter than the threshold time and the power OFF instruction has not been input, the main control unit 22 repeats the processing at Steps S16 and S18.

If it is determined that there is a power OFF instruction (Yes) at Step S18, the main control unit 22 performs a power OFF process, that is, a process of stopping power supply to the respective units to stop the functions of the mobile communication device 10 at Step S20.

In this manner, the mobile communication device 10 obtains the position information every time a certain time (the threshold time) is elapsed, and transmits the information to the server 6. A number of mobile communication devices 10 on the communication network 3 perform similar processing. The server 6 thus has pieces of position information transmitted from a number of mobile communication devices 10. A number of onboard communication devices 40 also perform similar processing. The server 6 thus has pieces of position information transmitted from a number of onboard communication device 40. The server 6 also updates the pieces of position information of the mobile communication devices 10 and the onboard communication device 40 that the server 6 has every time the position information is transmitted from a mobile communication device 10 or an onboard communication device 40. In this manner, the server 6 holds a map representing position information of the mobile communication devices 10 and the onboard communication devices 40, that is, map information representing information on the locations of communication devices.

Next, operation of the mobile communication device 10 will be described with reference to FIGS. 6 and 7. FIGS. 6 and 7 are flowcharts illustrating examples of processing operation of the mobile communication device. More specifically, FIG. 6 is a flowchart illustrating processing operation of an application for performing a warning process based on environment information by the main control unit 22. FIG. 7 is a flowchart illustrating processing operation of an alarm mode performed during the processing operation of FIG. 6. First, the mobile communication device 10 starts processing by loading a program of the application for performing a warning process based on environment information stored in the storage unit 24 onto the main control unit 22 and executing the application for performing the warning process based on environment information.

The main control unit 22 obtains position information at Step S22. The position information can be obtained in the same manner as in Step S12 described above. If the position information obtained at Step S12 can be used, new position information need not be obtained by the GPS receiver 34 and the obtained position information may be used.

After obtaining the position information at Step S22, the main control unit 22 obtains environment information at Step S23. The environment information is information on other communication devices that are within a certain distance around the mobile communication device 10. The main control unit 22 communicates with the server 6 to obtain information on other communication devices that are within a certain distance around the mobile communication device 10 from the map representing position information of the mobile communication devices 10 and the onboard communication devices 40 stored in the server 6. In the present embodiment, the main control unit 22 obtains position information of onboard communication devices 40 that are within a certain distance around the mobile communication device 10. The main control unit 22 obtains the environment information on the basis of the position information obtained at Step S22.

After obtaining the environment information at Step S23, the main control unit 22 determines whether an alarming object is present at Step S24. Specifically, the main control unit 22 determines whether an alarming onboard communication device 40 is present on the basis of the environment information obtained at Step S23. The criteria for determining whether a device is an alarming object can be set on various conditions. For example, the main control unit 22 may make determination on the basis of whether an onboard communication device 40 is present within a certain distance, whether an onboard communication device 40 is present in the traveling direction of the mobile communication device 10 and within a certain distance, whether an onboard communication device 40 moving toward the mobile communication device 10 is present, or whether an onboard communication device 40 that is within a certain distance and approaching an area on an extension in the traveling direction of the mobile communication device 10.

If it is determined that no alarming object is present (No) at Step S24, the main control unit 22 proceeds to Step S22 and detects the position information again. Thus, the main control unit 22 repeats the processing from Step S22 to Step S24 until an alarming object is detected (determined to be present) at Step S24.

If it is determined that an alarming object is present (Yes) at Step S24, the main control unit 22 enters an alarm mode and performs processing of the alarm mode at Step S26. Processing of the alarm mode will be described below with reference to FIG. 7.

When the alarm mode is entered, the main control unit 22 obtains position information at Step S40. The position information can be obtained in the same manner as in Step S12 described above. After obtaining the position information at Step S40, the main control unit 22 obtains environment information at Step S42. The environment information can be obtained in the same manner as in Step S23 described above. The main control unit 22 obtains latest position information and environment information by the processing at Steps S40 and S42.

After obtaining the environment information at Step S42, the main control unit 22 determines whether to output a warning at Step S44. The main control unit 22 also determines whether to output a warning on the basis of the environment information. Various criteria can be set for the determination on whether to output a warning. The warning to be output is also switched depending on the environmental circumstances. For example, when a warning is to be output as a voice, a voice saying "A car is approaching from a road ahead.", "Be careful of collision with a car." or "Danger! Attention to crash." can be set to be output through the receiver 16 or a speaker or the like that is separately provided.

When a warning is to be output as an image, a screen with a text "A car is approaching." with a yellow background, a screen with a text "Be careful of collision with a car." with a red background, or a screen with a text "Danger! Attention to crash." with a flashing red background may be set to be displayed on the display unit 32.

The main control unit 22 can switch the warning to be output depending on the environmental circumstances as described above. For example, the warning to be output may be set to a voice saying "A car is approaching." when the distance to an alarming onboard communication device is 30 m or longer, to a voice saying "Be careful of collision with a car." when the distance to an alarming onboard communication device is equal to or longer than 20 m and shorter than 30 m, or to a voice saying "Danger! Attention to crash." when the distance to an alarming onboard communication device is shorter than 20 m. It is said that about 20 m is required for a car to come to a completely stop after a danger is detected and a stop action is taken (a brake is applied) while travelling on an ordinary road.

If it is determined to output a warning (Yes), that is, if it is determined that the environment information satisfies a condition to output a warning at Step S44, the main control unit 22 performs the warning operation at Step S46. Specifically, the main control unit 22 outputs the warning determined to be output at Step S44. The main control unit 22 then terminates the operation in the alarm mode.

If it is determined not to output a warning (No), that is, if it is determined that the environment information does not satisfy a condition to output a warning at Step S44, the main control unit 22 terminates the operation in the alarm mode without any processing.

The description on the operation of the main control unit 22 is continued referring back to FIG. 6. After performing the operation in the alarm mode at Step S26, the main control unit 22 determines whether to exit the alarm mode at Step S28. The determination on whether to exit the alarm mode can also be based on various settings. For example, the alarm mode can be set to be exited when no alarming onboard communication device is detected. The environment information is updated by the processing at Step S26 (more specifically, Step S42) in the alarm mode.

If it is determined not to exit the alarm mode (No), that is, to continue the alarm mode at Step S28, the main control unit 22 proceeds to step S26. Thus, the main control unit 22 repeats the processing in FIG. 7 described above until the alarm mode is exited.

If it is determined to exit the alarm mode (Yes) at Step S28, the main control unit 22 enters an ordinal mode at Step S30. The ordinal mode is a mode in which the processing in FIG. 7 is not performed. After entering the ordinal mode at Step S30, the main control unit 22 determines whether a power OFF instruction is present at Step S32. If it is determined that no power OFF instruction is present (No) at Step S32, the main control unit 22 proceeds to step S22 and obtains the position information. The main control unit 22 repeats the processing from Step S22 to Step S32 until a power OFF instruction is input.

If it is determined that a power OFF instruction is present (Yes) at Step S32, the main control unit 22 performs a power OFF process, that is, a process of stopping power supply to the respective units to stop the functions of the mobile communication device 10 at Step S34.

The communication system 1 and the mobile communication device 10 can inform the user (the holder of the mobile communication device 10) in advance that the user is in imminent danger by outputting a warning on the basis of the environment information. Specifically, the mobile communication device 10 can detect in advance that a running car (a car in which an onboard communication device 40 is mounted) is approaching and warn the user of the same. As a result, it is possible to reduce the risk of the user having an accident. More specifically, a warning can be output in advance even in a case where a holder of a mobile communication device 10 and a car in which an onboard communication device 40 is mounted approach a blind intersection or the like and there is a risk of collision as the holder and the car meet. As a result, the holder of the mobile communication device 10 can recognize the car, take actions to decelerate or stop, and reduce the possibility of having an accident.

While the embodiment described above has been described as a case of a mobile communication device 10, similar processing can be performed for a case of an onboard communication device 40. In the case of an onboard communication device 40, various criteria on the basis of which a warning is to be output can be set. The warning to be output is switched depending on the environmental circumstances. For example, when a warning is to be output as a voice, a voice saying "A pedestrian is approaching from the left road.", "Be careful of collision with a pedestrian within 10 m ahead.", or "Danger! Attention to accident." can be set to be output through the speaker 58 or the like. When a warning is to be output as an image, a screen with a text "A pedestrian is approaching." with a yellow background, a screen with a text "Be careful of collision with a pedestrian." with a red background, or a screen with a text "Danger! Attention to accident." with a flashing red background may be set to be displayed on the display unit 52.

The main control unit 42 can switch the warning to be output depending on the environmental circumstances as described above. For example, the warning to be output may be set to a voice saying "A pedestrian is approaching" when the distance to an alarming mobile communication device is 30 m or longer, to a voice saying "Be careful of collision with a pedestrian." when the distance to an alarming mobile communication device is equal to or longer than 20 m and shorter than 30 m, or to a voice saying "Danger! Attention to accident." when the distance to an alarming mobile communication device is shorter than 20 m.

In this manner, if the fact that a pedestrian is nearby can be known in advance, the driver can take actions (decelerate, sound the horn, carefully drive, etc.) in the case of the onboard communication device 40. As a result, it is possible to reduce the risk of having an accident.

The communication system 1 can reduce accidents between cars and pedestrians by obtaining position information of at least one type of communication devices and providing the position information as environment information to another type of communication devices; however, the communication system 1 may obtain position information of both types of communication devices, provide environment information to both types of communication devices and perform the processing described above. As a result, a car and a pedestrian can be aware of the presence of each other, the risk of causing accidents can be further reduced and the road safety can be further improved.

The environment information that the server 6 transmits to at least ones of the mobile communication devices 10 and the onboard communication devices 40 may be any information relating to the positions of communication devices located therearound and information in various states can be used therefor. For example, the environment information may be position information of all communication devices present within a certain range. Alternatively, the environment information may be only position information of communication devices located at positions satisfying a condition for being alarming objects. Specifically, the server 6 may detect the traveling direction of a mobile communication device 10, extract only position information of onboard communication devices that are within a certain distance in the traveling direction, and transmit the extracted environment information. Alternatively, the server 6 may detect the traveling directions of communication devices, extract position information of onboard communication devices 40 that travel toward a mobile communication device 10, and transmit the extracted environment information. Still alternatively, information indicating whether it is necessary to enter the alarm mode or which level of warning needs to be output may be transmitted as the environment information.

As described above, the processing performed by the mobile communication devices 10 and the onboard communication devices 40 can be reduced by transmitting information obtained by processing the environment information to be transmitted by the server 6, more specifically a signal informing a danger or a warning (danger information signal) directly as a control signal. As a result, it is possible to save the battery. When the amount of environment information is large, processing according to settings of the respective communication devices can be performed even though the amount of processing at the main control units 22 and 42 is increased. As a result, it is possible to more rapidly obtain necessary information.

Determination on whether to enter the alarm mode and determination on whether to output a warning may be made on the basis of the traveling direction in addition to the distances as described above. Description will be made below with reference to FIG. 8. FIG. 8 is an explanatory diagram for explaining an example of processing operation of the communication system. In the example illustrated in FIG. 8, a T-junction in which a road 72 is connected to a road 70 is illustrated. A car 7 in which an onboard communication device 40 is mounted and a car 7a in which an onboard communication device 40a is mounted travel in the same direction on the road 70. The car 7 is approaching a section where the road 70 joins with the road 72. The car 7a has passed through the section where the road 70 joins with the road 72.

A mobile communication device 10a is moving on a sidewalk on a side of the road 70 opposite to the side where the road 70 is connected to the road 72 in a direction opposite to the traveling direction of the car 7 and away from the car 7. A mobile communication device 10 moving toward the section where the road 72 joins with the road 70 is present on the road 72.

When the positional relations among the mobile communication devices 10, 10a and the onboard communication devices 40, 40a are as described above, the mobile communication device 10 sets an alarming range 80 so that the side toward the traveling direction is larger than the opposite side. As a result, it is possible to more accurately determine an alarming onboard communication device. Since the car 7 is within the range 80, the mobile communication device 10 enters the alarm mode.

The onboard communication device 40 also sets an alarming range 82 so that the side toward the traveling direction is larger than the opposite side. As a result, it is possible to more accurately determine an alarming mobile communication device. Although both the mobile communication devices 10 and 10a are within the range 82, the onboard communication device 40 may set the mobile communication device 10 as an alarming object and excludes the mobile communication device 10*a* that has already passed from the alarming objects. In this manner, a more accurate control can be performed by excluding a communication device that is less likely to collide with from the alarming objects even if the communication device is included in the range 82. The traveling direction can be calculated from a change in the position information. The communication system 1 may change the alarming range (distance) according to the moving speed.

The server 6 and/or an onboard communication device 40 may exclude a mobile communication device 10 that is in a building from the alarming objects. In other words, the server 6 and/or an onboard communication device 40 may determine whether a mobile communication device 10 is in a building or on a road on the basis of the position information, and sets only mobile communication devices 10 that are on the road as the content of the environment information. As a result, it is possible to reduce unnecessary warnings and more accurately output a warning.

The mobile communication device 10 may be set not to enter the alarm mode when the mobile communication device 10 is in a building. As a result, it is possible to reduce unnecessary warnings and more accurately output a warning. In other words, it is possible to reduce situations of annoying the user by outputting a warning even in a safe state.

The communication system 1 may perform the processing on a specific area or region. In other words, the processing may be applied to roads with bad visibility but not to roads with good visibility and highways. As a result, it is possible to perform the processing appropriately in areas where accidents are likely to occur and reduce the processing load on the entire system.

It may be configured to provide the short-range communication unit 36 in public transportation such as a bus or a train and to set the short-range communication unit 36 to communicate with a short-range communication unit 36 of a mobile communication device 10 present in the public transportation (in the vehicle) and input an instruction not to perform the processing in the alarm mode. As a result, it is possible to prevent a mobile communication device 10 present in public transportation from detecting a vehicle traveling on a road and making a warning.

The communication system 1 may switch alarming or criterial communication devices on the basis of the moving speeds and may exclude communication devices that are not moving from alarming objects. As a result of excluding communication devices that are not moving from alarming objects, it is possible to reduce situations in which a warning is output when there is a mobile communication device or an onboard communication device that is stopping at an intersection or when there is an onboard communication device in a parked car. Since there is a possibility of a sudden rush out, a communication device that is stopped may be included in alarming object.

The communication system 1 may also exclude an onboard communication device 40 traveling on an expressway or a motorway from alarming objects. As a result, it is possible to prevent a warning from being output even when there is no risk of collision with a pedestrian.

The communication system 1 may perform communication between the server 6 and at least one of the mobile communication devices 10 and the onboard communication devices 40 through SMS (circuit switching). In particular, communication to transmit the environment information in the alarm mode may be performed through SMS and direct transmission of a danger information signal may be performed through SMS. As a result, it is possible to more rapidly transmit information and reduce the risk of a delay in transmitting information.

The onboard communication device 40 may obtain an image with a front view camera or a side view camera, more particularly, obtains an image in an direction where an alarming object is present, and displays the obtained image in the alarm mode. As a result, it is possible to more rapidly recognize a person when the person comes out and makes accidents less likely to be caused.

The communication system 1 may set the alarm mode and criterion values for warning to be different depending on the lane on which a car is traveling (on which an onboard communication device 40 is present). Specifically, the settings and the criterion values may be more strict (in a state where a warning or an alarm is more likely to be given) when the car is near a sidewalk, or the settings and the criterion values may be more moderate (in a state where a warning or an alarm is less likely to be given) when the car is in the center of the road (near the median strip or the like).

While the onboard communication devices 40 are devices in cars in the embodiment described above, the present invention is not limited thereto. For example, the onboard communication devices 40 may be detachable communication devices. When a mobile communication device 10 is held in a car, the mobile communication device 10 may be used as an onboard communication device. In this case, the moving mode of the mobile communication device 10 may be set and switched between an onboard mode when the mobile communication device 10 is moving in a car and a walk mode when the holder of the mobile communication device 10 is moving on foot. The moving mode may be automatically determined on the basis of the moving speed.

While the cases of a car (vehicle) and a pedestrian are described in the embodiment described above, the present invention is not limited thereto. The present invention can also be applied to cases where moving means are bicycles, motorbikes (motorcycles) or on foot. The present invention can also be applied to relations between the same moving means. Specifically, a mobile communication device moving on a bicycle can set another mobile communication device moving on a bicycle to be included in the environment information. Examples of vehicles include various vehicles (two-wheel vehicles, four-wheel vehicles, trucks) that run by means of engines and motors. While the onboard communication devices are described in the embodiment described above, any mobile communication devices may be used and the onboard communication devices may be various mobile communication devices. In other words, the onboard communications devices need not be mounted on vehicles such as cars.

While the communication system 1 according to the embodiment described above makes determination using the position information of respective communication devices supplied via the server 6 as the environment information, the communication system 1 may obtain relative position information by using short-range communication units 36 and 56, and use the relative position information as the environment information. For example, the communication system 1 may detect relative positional relations by obtaining the environment information from the server 6 similarly to the above description, activating the short-range communication units 36 and 56 when the alarm mode is entered, detecting communication devices that can communicate with, exchanging information therewith, and detecting a change in the intensity of waves. Information can be obtained in a shorter time by using information that is directly exchanged in this manner.

Although the communication system 1 can make more accurate determination by using a larger amount of information, the communication system 1 may determine whether to output a warning by using only information obtained by the short-range communication units 36 and 56 as the environment information without obtaining environment information from the server 6 when the alarm mode is entered.

While the communication system 1 described above obtains the position information and the environment information by using the server 6 via the GPS satellites 3 and the communication network 3, the present invention is not limited thereto. For example, processing similar to the above may be performed using only the environment information obtained by the short-range communication units 36 and 56 without obtaining position information based on normal coordinates using the GPS or the like.

Figure 9:
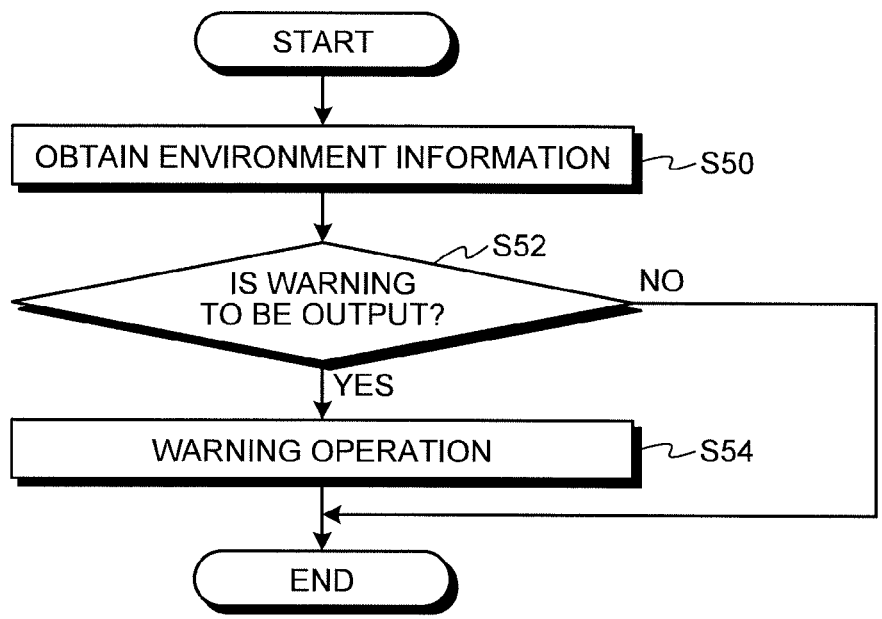
FIG. 9 is a flowchart illustrating an example of processing operation of the mobile communication device.

Operation of a mobile communication device 10 in the communication system 1 will be described with reference to FIG. 9. Similar processing is performed by an onboard communication device 40. FIG. 9 is a flowchart illustrating an example of processing operation of the mobile communication device. First, the main control unit 22 of the mobile communication device 10 obtains environment information at Step S50. In the present embodiment, the main control unit 22 activates the short-range communication unit 36 and searches for another short-range communication unit 36 that can be communicated with. The main control unit 22 obtains the environment information on the basis of the search result. Specifically, if a short-range communication unit 36 that can be communicated with is detected, the main control unit 22 detects the environment information by obtaining information held by the detected short-range communication unit 36 and detecting relative positional relation on the basis of the intensity of waves and/or a time lag of signals. If a short-range communication unit 36 that can be communicated with is not detected, the main control unit 22 may determine that an alarm or a warning is not needed.

After obtaining the environment information at Step S50, the main control unit 22 determines whether to output a warning at Step S52. The determination on whether to output a warning is similar to the processing at Step S44.

If it is determined to output a warning (Yes), that is, if it is determined that the environment information satisfies a condition to output a warning at Step S52, the main control unit 22 performs the warning operation at Step S54. Specifically, the main control unit 22 outputs the warning determined to be output at Step S52. The processing at Step S54 is similar to that at Step S46 described above. The main control unit 22 then terminates the processing.

If it is determined not to output a warning (No), that is, if it is determined that the environment information does not satisfy a condition to output a warning at Step S52, the main control unit 22 terminates the operation in the alarm mode without any processing. The main control unit 22 may repeat the processing from Step S50 to Step S54 at every predetermined time.

As described above, the mobile communication device 10 can determine the environmental circumstances and determine whether to output a warning by using only the environment information obtained by the short-range communication unit 36. The mobile communication device 10 can also detect an imminent danger in advance and warn the user of the same since a certain range of information can be obtained by the short-range communication unit 36. As a result, the user can be aware of the presence of the other, the risk of causing accidents can be further reduced and the road safety can be further improved.

While the embodiment is described as a case where the communication devices are mobile communication devices that are mobile to reduce accidents occurring while traveling, the present invention is not limited thereto. The communication system and the mobile communication device according to one aspect of the present invention may obtain information of fixed communication devices as environment information by means of communication of the short-range communication units, and output a warning when a prohibited area (region) is approached or entered.

Figure 10:
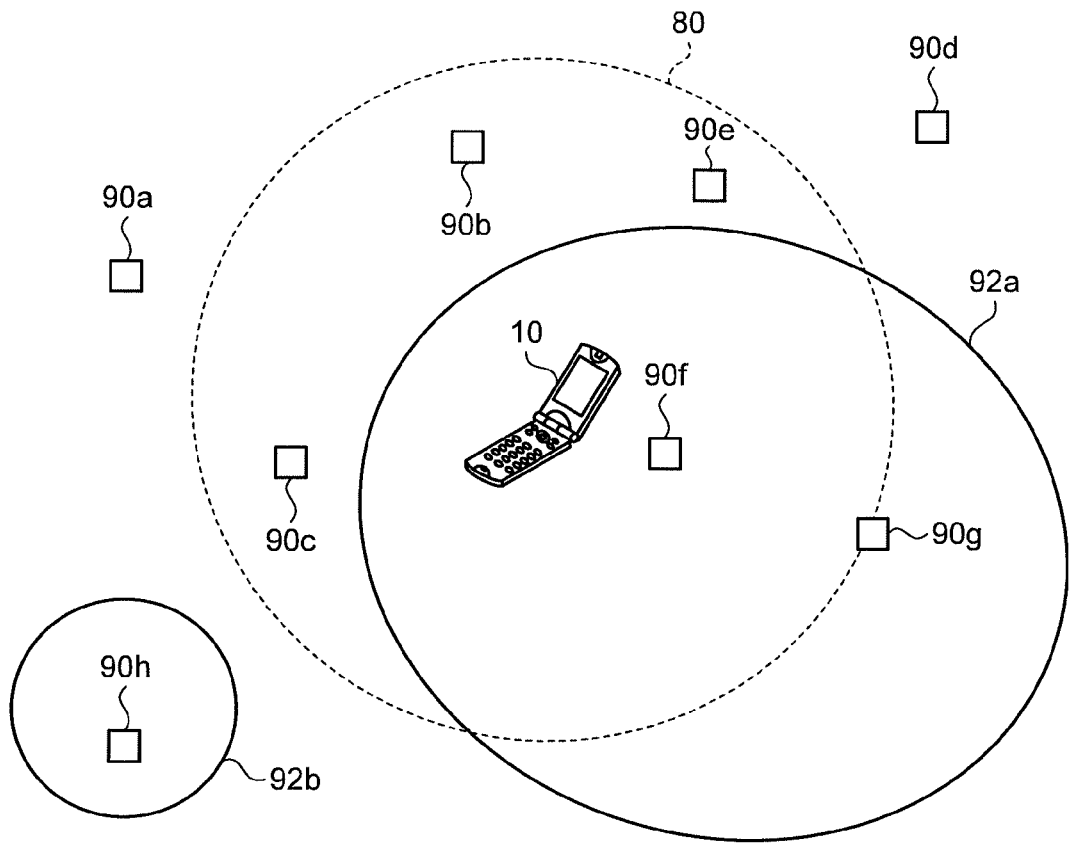
FIG. 10 is an explanatory diagram for explaining another example of processing operation of the communication system.

An example thereof will be described below with reference to FIG. 10. FIG. 10 is an explanatory diagram for explaining another example of processing operation of the communication system. As illustrated in FIG. 10, communication devices 90*a*, 90*b*, 90*c*, 90*d*, 90*e*, 90*f*, 90*g* and 90*h* are arranged around a mobile communication device 10. The coverage area of the short-range communication unit 36 of the mobile communication device 10 is the range 80. The communication devices 90*a* to 90*h* each include a short-range communication unit 36, and output position information through communication. The communication devices 90*a*, 90*b*, 90*c*, 90*d* and 90*e* are arranged in an area that is not a prohibited area. The communication devices 90*f* and 90*g* are arranged in a prohibited area 92*a*. The communication device 90*h* is arranged in a prohibited area 92*b*.

As illustrated in FIG. 10, when the mobile communication device 10 is in the prohibited area 92*a*, the mobile communication device 10 can communicate with the communication devices 90*c*, 90*b*, 90*e* and 90*f* included in the range 80. The mobile communication device 10 communicates with the communication devices that can be communicated with by using the short-range communication unit 36, and obtains information as the environment information from the communication devices 90*c*, 90*b*, 90*e* and 90*f*.

The mobile communication device 10 detects that the mobile communication device 10 is in the prohibited area 92*a* from the information included in the communication device 90*f* out of the obtained information. When it is detected that the mobile communication device 10 is in the prohibited area 92*a*, the mobile communication device 10 determines to output a warning and performs the warning operation. The processing can be performed by the processing operation in FIG. 9 described above.

In this manner, the communication system 1 and the mobile communication device 10 can perform control to output a warning when the prohibited area is entered by using communication devices that are fixed to places as the communication devices from which the environment information is obtained. As a result, it is possible to prevent a child, a pet or a domestic animal from entering prohibited areas and reduce the risk of being involved in a danger by making the child, the pet or the domestic animal carry the mobile communication device 10. It is also possible to train a pet or a domestic animal. It is also possible to provide an indoor article such as an electric appliance and a piece of furniture with a short-range communication unit and obtain indoor information as the environment information so as to output a warning when it is attempted to touch an article that must not be touched.

The communication system 1 may use information of characteristics of places (river, downtown, park, ruins, type of stores, etc.) and characteristics of articles (fragile, dangerous, etc.) in addition to the position information as the information output by the short-range communication units of the communication devices. As a result, it is possible to make determination on the condition to output a warning on the basis of the characteristics in addition to the positions. It is thus possible to appropriately output a warning in unknown regions.

While cases where the warning is output as a voice and cases where the warning is output as an image are described in the embodiment described above, the warning is not limited thereto. For example, a specific smell may be emitted as an output of the warning. Specifically, a smell emitting source such as an olfactory display that can emit a smell is provided in the mobile communication device 10. The smell emitting source may be adapted to emit a plurality of smells. When an instruction to output a warning is input, the mobile communication device 10 emits a determined smell. As a result, the user can be aware of the warning by means of the smell. The smells may be irritating ones so as to be easily recognized. In a case where a warning is to be output when a prohibited area is entered, a smell that is disliked by the holder of the mobile communication device 10 is emitted. For example, if the holder is a child, it is possible to restrain only children from entering the prohibited area by emitting a smell that is disliked by children but not disliked by adults. The same applies to cases of pets.

Alternatively, an electric current may be applied as an output of a warning. As a result, it is possible to recognize an output of a warning by a bodily sensation. In a case where a warning is to be output when a prohibited area is entered, the electric current is applied each time the prohibited area is entered, which causes pain. As a result, it is possible to prevent a pet or a domestic animal from entering a prohibited area.

Alternatively, a device may be vibrated as an output of a warning. As a result of vibrating the device, it is possible to recognize an output of a warning by a bodily sensation. In a case where a warning is to be output when a prohibited area is entered, it is possible to attach the device to a collar of a pet and vibrate the collar when the prohibited area is entered so as to prevent the action of the pet.

Alternatively, the temperature of a device may be changed as an output of a warning in a manner that the device is designed to generate heat, for example. In a case where heat is generated, heat in a temperature range that does not affect the human body is generated. As a result of a change in the temperature of the terminal, it is possible to recognize an output of a warning. In a case where a warning is output when a prohibited area is entered, the user holding the device that has changed in temperature feels uncomfortable and it is thus possible to encourage the user to move out of the prohibited area.

In a case where a warning is to be output when a prohibited area is entered and the warning is to be output in a form of a sound as described above, a loud sound may be output instead of a voice message. In a case where the holder of the mobile communication device is a child, a high-frequency sound (mosquito sound, etc.) that is audible to children but not to adults may be output.

INDUSTRIAL APPLICABILITY

As described above, the communication system and the mobile communication device according to the present invention are useful as a communication device having a risk aversion function.

The invention claimed is:

1. A communication system, comprising:
at least one mobile communication device including:
a first position information obtaining unit configured to obtain information of the mobile communication device;
a first communication unit configured to communicate with another communication device;
a warning unit configured to perform a warning process; and
a control unit configured to control operation of the warning unit, and
at least one movable communication device including:
a second position information obtaining unit configured to obtain position information of the movable communication device; and
a second communication unit configured to communicate with another communication device; and
a server that is configured
to store the position information through communication with the mobile communication device and the movable communication device, and
to transmit the stored position information to at least one of the mobile communication device and the movable communication device,
wherein the control unit is configured to decide, based on a moving speed of the movable communication device, whether to exclude the movable communication device from alarming objects.

2. The communication system according to claim 1, wherein
the server is configured to
extract the position information of the movable communication device that is within a preset range around the mobile communication device on a basis of the position information of the mobile communication device transmitted therefrom, and
transmit the extracted position information to the mobile communication device, and
the mobile communication device is configured to perform a warning process when the movable communication device that is within a predetermined distance and approaching the mobile communication device or approaching an area on an extension in a traveling direction of the mobile communication device is present on a basis of position information of the movable communication device transmitted from the server.

3. The communication system according to claim 1, wherein
the mobile communication device configured to transmit the position information of the mobile communication device to the server via the first communication unit only when the position information is within a predetermined area.

4. The communication system according to claim 1, wherein
the server is configured to
extract the position information of the mobile communication device that is within a preset range around the movable communication device on a basis of the position information of the movable communication device transmitted therefrom, and
transmit the extracted position information to the movable communication device, and
the movable communication device is configured to perform a warning process when the mobile communication device that is within a predetermined distance and approaching the movable communication device or approaching an area on an extension in a traveling direction of the movable communication device is present on a basis of position information of the mobile communication device transmitted from the server.

5. A mobile communication device, comprising:
a communication unit configured to communicate with another communication device;

a position information obtaining unit configured to detect a position of the mobile communication device;

an environment information obtaining unit configured to obtain position information of a second communication device present around the mobile communication device on a basis of information of the position of the mobile communication device obtained by the position information obtaining unit;

a warning unit configured to perform a warning process; and a control unit configured to control operation of the warning unit on a basis of information obtained by the environment information obtaining unit, wherein the control unit is configured to decide, based on a moving speed of the second communication device, whether to exclude the second communication device from alarming objects.

6. The mobile communication device according to claim 5, wherein the second communication device is configured to be held by a pedestrian.

7. The mobile communication device according to claim 5, wherein the second communication device is configured to be mounted in a vehicle.

8. The mobile communication device according to claim 5, wherein the environment information obtaining unit is configured to obtain the position information of another communication device that is present within a predetermined range as the position information of the second communication device, and the control unit is configured to calculate a traveling direction of the second communication device from the information obtained by the environment information obtaining unit, and cause the warning process to be performed when the second communication device is determined to be approaching the mobile communication device and a distance thereto is determined to be within a predetermined range.

9. The mobile communication device according to claim 5, wherein the environment information obtaining unit is configured to obtain the position information of another communication device that is approaching to the position of the mobile communication device and at a distance within a predetermined range as the position information of the second communication device, and the control unit is configured to cause the warning process to be performed when the environment information obtaining unit obtains the information.

10. The mobile communication device according to claim 5, wherein the control unit is configured to switch the warning process performed by the warning unit depending on a distance to the second communication device.

11. The mobile communication device according to claim 5, further comprising:

a map information obtaining unit configured to obtain map information; and a display unit configured to display an image, wherein the control unit is configured to cause the display unit to display an image in which the position information of the second communication device that is present around the mobile communication device obtained by the environment information obtaining unit is superimposed on the map information.

12. The mobile communication device according to claim 11, wherein the map information obtaining unit is configured to obtain the map information including the position information obtained by the position information obtaining unit from an external storage device on a basis of the position information.

13. The mobile communication device according to claim 5, wherein the position information obtaining unit is configured to obtain position information by a global positioning system.

14. The mobile communication device according to claim 5, wherein the warning unit is configured to perform at least one of outputting a sound, emitting a smell, generating a vibration, applying an electric current, displaying an image, and changing a temperature as the warning process.

15. A mobile communication device, comprising:

an environment information obtaining unit configured to obtain information on environment of the mobile communication device;

a warning unit configured to perform a warning process;

a control unit configured to control operation of the warning unit on a basis of the information obtained by the environment information obtaining unit; and a storage unit configured to store information of a second communication device that is prohibited from approaching, wherein the environment information obtaining unit is configured to communicate with another communication device through a short-range communication technology to obtain information of the communication device, and the control unit is configured to cause the warning unit to perform the warning process when the second communication device that is prohibited from approaching is determined to be within a predetermined distance on a basis of the information of another communication device obtained by the environment information obtaining unit, wherein the control unit is configured to decide, based on a moving speed of the second communication device, whether to exclude the second communication device from alarming objects.

16. The mobile communication device according to claim 15, wherein the second communication device is configured to be arranged in a prohibited area.

17. The mobile communication device according to claim 15, wherein the second communication device is configured to be mounted in a vehicle.

18. The mobile communication device according to claim 15, wherein the warning unit is configured to perform at least one of outputting a sound, emitting a smell, generating a vibration, applying an electric current, displaying an image, and changing a temperature as the warning process.

* * * * *